United States Patent [19]

Hess

[11] 4,080,710
[45] Mar. 28, 1978

[54] MOLDED BATHTUB FIXTURE AND METHOD OF MANUFACTURING THE SAME

[75] Inventor: Stephen Walter Hess, Westminster, Calif.

[73] Assignee: Hessco Industries, Inc., La Habra, Calif.

[21] Appl. No.: 796,851

[22] Filed: May 16, 1977

[51] Int. Cl.² .......................... B29C 5/02; B29D 3/02
[52] U.S. Cl. ..................................... 29/416; 4/173 R; 29/526; 52/261; 52/264; 52/309.1; 264/157; 264/309; 264/160
[58] Field of Search ...................... 264/90, 92, 93, 138, 264/157, 153, 245, 257, 258; 29/416, 526, 264, 3; 52/35, 309.1, 261, 264; 4/5, 173, 187 R, 191; 312/228

[56] References Cited

U.S. PATENT DOCUMENTS

| | | | |
|---|---|---|---|
| 2,079,739 | 5/1937 | Houseweiler | 4/173 |
| 2,146,969 | 2/1939 | Marshall | 312/228 |
| 3,084,973 | 4/1963 | Beckley | 264/309 |
| 3,588,925 | 6/1971 | Kuypers et al. | 4/173 |
| 3,905,048 | 9/1975 | Moller | 4/146 |

FOREIGN PATENT DOCUMENTS 555,408  1/1957  Italy ........................ 4/146

Primary Examiner—Willard E. Hoag
Attorney, Agent, or Firm—Eric T. S. Chung

[57] ABSTRACT

An improved molded bathtub fixture adapted to be manufactured as a single piece to allow separation into two integral elements for installation and handling is disclosed. The subject bathtub fixture, including a bathtub and three upwardly extending contiguous walls is characterized by having a lateral bulge which extends for the length of the walls and which serves to permit the molded bathtub fixture to be separated into two separate pieces at a construction site to facilitate handling and installation.

7 Claims, 6 Drawing Figures

MOLDED BATHTUB FIXTURE AND METHOD OF MANUFACTURING THE SAME

BACKGROUND OF THE INVENTION

1. Field of the Invention

This invention generally relates to molded bathroom fixtures such as bathtub stalls or the like and methods of manufacturing the same.

2. Description of the Prior Art

The high cost of building construction has made necessary the development of cost-saving articles and technology. One such cost-saving article is a molded bathroom fixture, such as a bathtub, which may be formed by using plastic, fiberglass, or other material which permits the bathroom fixture to be manufactured by using a molding process.

Such molded bathroom fixtures are presently being used in the construction of hotels, apartment houses, as well as new homes. Because of the cost savings represented by such molded bathroom fixtures, as compared to porcelain fixtures that have previously been used, and which are substantially more expensive, such modern bathroom fixtures are particularly useful in the process of remodeling home construction.

The use of such molded bathroom fixtures, such as bathtubs, has been somewhat limited due to the size of the overall item, especially where the fixture includes not only the ordinary bathtub, but also includes the usual three walls which extend upwardly from the upper rim of the bathtub. Typically, a combined molded bathtub and wall assembly approximates 6 feet in height, 5 feet in length and 3½ feet in width. Such bulkiness and size often causes difficulty when the fixture is being installed in a bathroom due to the limited space through which the fixture may be moved, i.e., narrow hallways and/or doors.

Manufacturers of molded bathtub fixtures have sought to overcome such difficulties in installing the fixture by manufacturing the bathtub fixtures in two or more parts. As an example, each of the three walls which extend upwardly from the bathtub have been manufactured as separate elements. Other manufacturers have sought to manufacture the three walls as a single unit, separate from the bathtub.

The manufacture of such bathtub fixtures in multiple pieces presents several major problems. A first problem is that the same mold used for forming an integral fixture may not be used to form a multi-element fixture. Further, separate molds must be manufactured and used for each different element. The use of multiple molds is not only costly in terms of preparing the molds; but also in the economy of labor necessary to manufacture, pack and ship the fixture.

A second problem is that of maintaining and insuring the integrity of the combined fixture throughout the process of packing, transportation to a retailer and/or consumer, and finally, installation. As is readily apparent, in the event that fixtures are manufactured in a multiplicity of sizes, types, styles and/or colors, difficulties may arise whenever the several elements of a combined unit must be combined for shipping. Such difficulties may simply occur in the course of having one element either not delivered or lost in shipment. Other difficulties may result when elements are mismatched, by reason of color, size and/or texture of material.

It is thus the intention of the present invention to provide an improved molded bathtub fixture which is manufactured as a single element in a manner that permits the fixture to be separated at a construction site or the like, into two or more elements, to facilitate handling and moving of the fixture to an interior bathroom location for installation.

OBJECTS AND SUMMARY OF THE INVENTION

Accordingly, it is the object of the present invention to provide an improved molded bathtub fixture, and a method of manufacturing the same, that is efficient, simple and economical.

It is another object of the present invention to provide a molded bathtub fixture that is especially suitable for use in remodeling home construction.

It is yet another object of the present invention to provide a method of manufacturing improved bathtub fixtures, wherein existing molds used for manufacturing such fixtures may be readily and cheaply adapted for manufacturing improved bathtub fixtures.

It is a further object of the present invention to provide an improved bathtub fixture which is not susceptible to such handling problems as having parts thereof mismatched, separated and/or lost in the course of transportation to a construction site.

Briefly described, the present invention is an improved molded bathtub fixture which is adapted to be separated into two integral elements at a construction site prior to installation thereof in a bathroom or the like.

More particularly, the subject invention involves a molded bathtub fixture characterized by having a laterally extending bulge extending for the length of the three walls extending upwardly from the sides of the bathtub fixture, wherein said bulge permits the fixture to be separated by cutting along said bulge and reassembled by being joined along said bulge.

The features that characterize the novelty of the present invention are set forth with particularity in the appended Claims. Both the organization and manner of operation of the invention, as well as other objects and the attendant advantages thereof may be best understood by reference to the drawings, wherein like reference symbols designate like parts throughout the figures therein.

BRIEF DESCRIPTION OF THE DRAWINGS

FIGS. 2 through 6 are a series of schematic diagrams illustrating cross-sectional, partially fragmented side views of the laterally extending bulge in accordance with the present invention, which FIGS. 2 through 6 are useful in understanding the manner in which the subject invention is separated into two elements and reassembled in the process of installation.

DESCRIPTION OF THE PREFERRED EMBODIMENT

Figure 1:
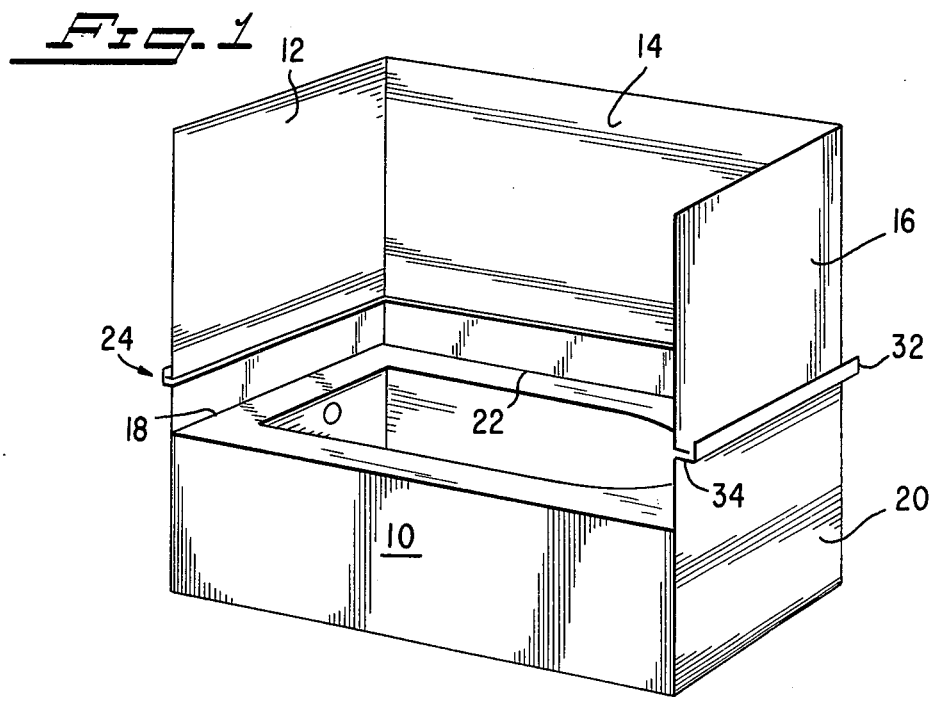
FIG. 1 is a schematic diagram illustrating a perspective view of an improved bathtub fixture in accordance with the present invention.

An improved molded bathtub fixture in accordance with the present invention is illustrated by FIG. 1 of the drawings. As shown, the bathtub fixture essentially involves a bathtub 10 and three walls 12, 14 and 16, which are situated to extend upwardly from each of the two ends 18 and 20 of the bathtub 10 and from one side 22 thereof.

Customarily, the bathtub 10 and the walls 12, 14 and 16 would be installed as a complete fixture in an alcove, or the like, situated in a bathroom to receive the same. The walls 12, 14 and 16 hence would serve to waterproof or protect the building walls from splashing water usually attendant to the use of the bathtub 10. The walls 12, 14 and 16 may further serve to provide a decorative function besides protecting the building walls from splashing water.

As earlier explained, it is customary presently to have the walls 12, 14 and 16 constructed as a single integral element with the bathtub 10. This process is usually accomplished with a single mold which is designed to have plastic, fiberglass, or other suitable material, suitably applied to the exterior of the mold. As an example, such material may be sprayed onto the exterior of the mold and permitted to dry, or be dried through conventional heating techniques. Such drying, once accomplished, is normally followed by having the molded bathtub fixture pulled from the mold and thereafter finished by polishing, trimming, and such repairing as may be necessary to make perfect the finished molded product.

As also earlier mentioned, a molded bathtub fixture including integral walls involves an item that is generally six feet in height, five feet in length and three and one-half feet in width. Such size makes it extremely difficult, if not sometimes impossible, to move the bathtub fixture into a bathroom being remodeled when limited hallway space is available for ingress and egress from the bathroom.

The present invention is thus manufactured to have a laterally extending bulge or trough that extends continuously and horizontally along the width of each of the walls 12, 14 and 16 at a height that may be generally half the height of the combined fixture. The general location of the bulge is indicated by the reference numeral 24 in FIG. 1.

Figure 2:
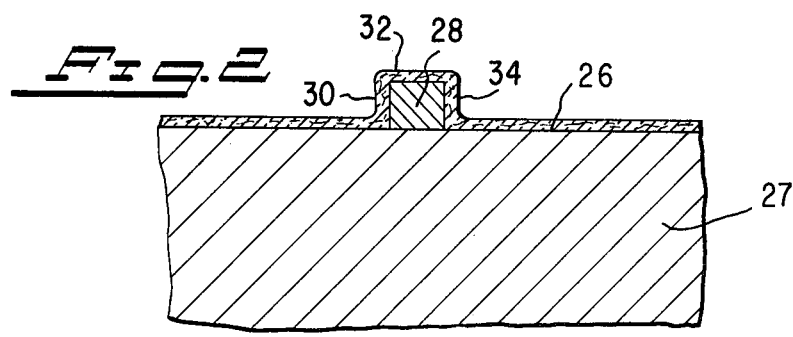
FIG. 2 is a schematic diagram illustrating a cross-sectional, partially fragmented view of a portion of the improved bathtub fixture including a laterally extending bulge in accordance with the present invention.
Figures 3, 4, 5, 6:
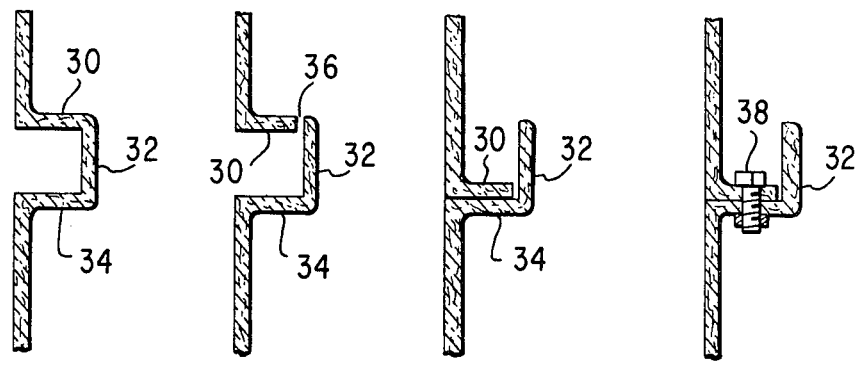

A side cross-sectional view of the lateral bulge is illustrated more clearly in FIGS. 2 and 3. Referring first to FIG. 2, the bulge is manufactured by applying to an appropriate surface 26 of a mold 27 used in manufacturing the bathtub fixture, a strip 28 which extends continuously along the surface 26 that serves to form the walls 12, 14, and 16 and specifically, corresponds with the location of the bulge thereon. The strip 28 may be wood and may have any suitable dimension desired; however, it has been empirically determined that the strip 28 may have a square cross-section of approximately one inch. It is to be understood that the bulge while described herein as having a rectangular or square cross-sectional configuration, may readily have other cross-sectional configurations.

As shown by FIGS. 2 and 3, the strip 28 serves to create on the bathtub fixture a laterally extending bulge having three walls, 30, 32, and 34. The bulge so created serves several purposes as is now explained. Firstly, the bulge serves to identify the exact location at which the upper portions of the walls 12, 14 and 16 are to be separated from the lower portion of the walls and the bathtub fixture 10. Such separation may be readily accomplished by having the wall 30 of the bulge cut along a location 36 as shown by FIG. 4. As may be readily understood such cutting serves to separate the upper portion of the walls 12, 14 and 16 from the bathtub and a lower portion of the walls to permit such halves to be readily transported into a bathroom being remodeled.

Upon being so transported to the bathroom or other intended location, the upper and lower halves of the bathtub fixture may then be reassembled by having the upper portion of the walls 12, 14 and 16 joined along the walls 30 and 34 of the bulge. As shown in FIG. 5, the wall 30 is adapted to be rested on the wall 34. The wall 32 serves to prevent water splashed up against the walls 12, 14 and 16 from entering the joint formed and flowing into the area back of the bathtub fixture.

Referring to FIG. 6, the upper and lower halves of the bathtub fixture may be secured by a series of bolts 38 which are placed through matching apertures extending through the walls 30 and 34. A reasonable number of bolts 38 should be used. Such bolts 38 should be used to secure the upper and lower halves of the bathtub fixture before the combined fixture is installed in the alcove prepared to receive the bathtub fixture. Such installation of the bathtub fixture may then be accomplished in a conventional manner.

It is apparent that the use of a molding strip 28 to create the bulge on the bathtub fixture in accordance with the present invention permits a molding 27 used for forming an integral fixture to be easily and cheaply adapted to form in effect two element fixtures without requiring that two additional and separate molds be prepared for the purpose of separately manufacturing the upper and lower halves of bathtub fixtures in accordance with the present invention as is presently required in accordance with standard practice. The savings resulting from such use of a single mold to prepare and manufacture different fixtures is of course obvious.

It is now clear from the foregoing description that the present invention provides an efficient and economical method of manufacturing improved molded bathtub fixtures which are adapted to be transported to construction sites as a single element, thereby avoiding any possibility of separation and/or loss of one of the two halves wherein the individual halves are adapted to be readily separated at the construction site, moved as two separate halves into a bathroom area of limited access, and re-assembled for installation.

It is to be understood that despite the foregoing description dealing principally with bathtub fixtures, that shower stalls, wash basins or other large fixtures intended for installation in confined building areas may be manufactured by using the technique of the present invention.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the invention be made.

What is claimed is:

1. The method for forming a molded bathtub and associated wall extending above the bathtub, comprising:

molding a plastics bathtub with an integral wall extending above a rim of the tub and forming in said wall an outwardly extending bulge having three connected wall portions along a length of the wall;
severing said wall along its length in the vicinity of the bulge to form mating upper and lower flanges, from said wall portions, which can be interfitted together to form said bathtub with said associated wall extending above the bathtub.

2. The method defined by claim 1, said step of molding including the steps of:

placing a raised strip on a portion of a mold used to form said bathtub fixture, said portion corresponding to the location of said wall section on which said bulge is formed;

covering said raised strip and said mold with solidifable material with which said bathtub fixture is being formed;

solidifying said material; and separating said material when solidified from said mold and said raised strip, whereby said solidified material is a bathtub fixture.

3. The method defined by claim 2, said step of placing including the steps of:

shaping a raised strip to have a uniform cross-sectional configuration conforming to a corresponding configuration desired for said bulge; and securing said raised strip to the surface of said mold.

4. The method of claim 1 wherein said three connected wall portions form a channel and said wall portions are severed so as to form said upper flange extending outwardly from said wall and said lower flange extending outwardly from a wall portion associated with said bathtub and extending above said bathtub said lower flange terminating in a portion extending at an angle to said lower flange in a direction away from said bathtub so as to prevent water from entering a joint between said upper and lower flanges and flowing behind the bathtub when said wall and said tub are secured together through said upper and lower flanges.

5. The method of claim 1 with the additional steps of assemblying said wall and said bathtub by mating said upper and lower flanges and securing said flanges together with mechanical fasteners.

6. The method of claim 5 including securing said flanges together with threaded fasteners.

7. The method of claim 6 wherein said threaded fasteners are bolts.

* * * * *